July 16, 1940.  E. P. KRAJEWSKI  2,208,035
SPRING STRUCTURE
Filed June 30, 1938  2 Sheets-Sheet 1

INVENTOR.
Edward P. Krajewski
BY Earl & Chappell
ATTORNEYS

July 16, 1940.　　　E. P. KRAJEWSKI　　　2,208,035
SPRING STRUCTURE
Filed June 30, 1938　　　2 Sheets-Sheet 2

INVENTOR.
Edward P. Krajewski
BY Earl & Chappell
ATTORNEYS

Patented July 16, 1940

2,208,035

UNITED STATES PATENT OFFICE 2,208,035

SPRING STRUCTURE

Edward P. Krajewski, Detroit, Mich., assignor to L. A. Young Spring & Wire Corporation, Detroit, Mich.

Application June 30, 1938, Serial No. 216,713

5 Claims. (Cl. 5—272)

This invention relates to improvements in spring structures.

The main objects of this invention are:

First, to provide an improved spring assembly or unit in which the springs are very securely locked or retained in their assembled relation and at the same time one in which the springs may be very rapidly assembled.

Second, to provide a spring structure having the advantages described which may be employed or adapted in large or small assemblies with equal advantage.

Further objects pertaining to details and economies of my invention will definitely appear from the description to follow. The invention is defined in the claims.

A structure which embodies the features of my invention is clearly illustrated in the accompanying drawings in which.

Figure 1:
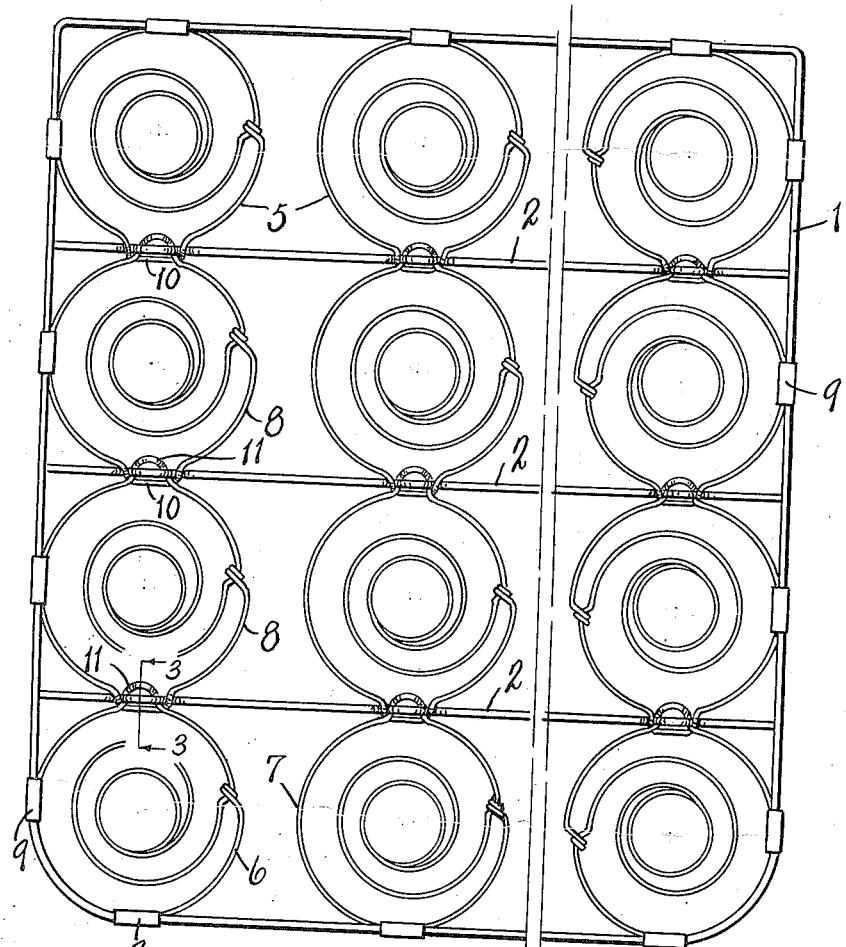
Fig. 1 is an inverted fragmentary view of a spring unit or assembly embodying features of my invention.

In the embodiment of my invention illustrated the base frame 1 is formed of wire or rod stock, but it will be appreciated that it may be of any desired stock or material. The cross members 2 are disposed in spaced parallel relation and welded at their ends to opposed members of the border frame. These cross members have a plurality of pairs of loop-like offsets 3, the offsets being spaced by relatively short reaches 4. These offsets are spaced on the cross members so that they aline transversely of the cross members and the springs engaged therewith are supported in rows transversely of the cross members, each row comprising the end springs of the rows 6 and 7 and the intermediate springs of the row 8. In the embodiment illustrated these springs are all of the helical or hour-glass type and are the same except for slight differences in one end coil. Different reference numerals are used for convenience in description. The springs adjacent the border frame are secured thereto by means of clips 9.

Figure 2:
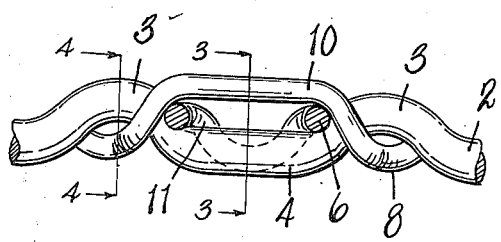
Fig. 2 is an enlarged fragmentary view in section on line 2—2 of Fig. 3.
Figure 3:
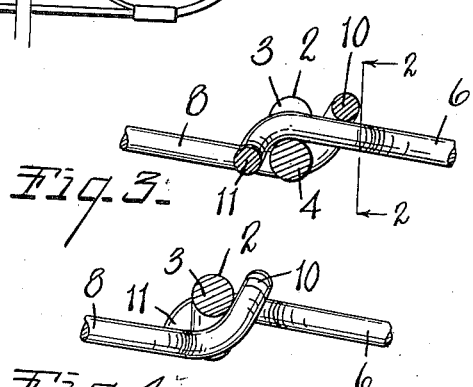
Fig. 3 is a fragmentary view in section on line 3—3 of Fig. 2.
Figure 4:
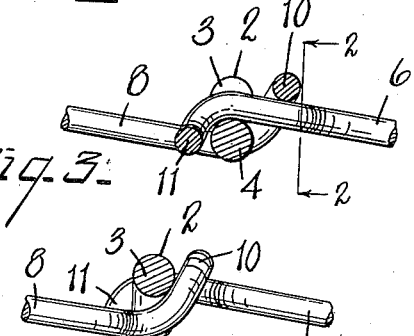
Fig. 4 is a fragmentary view in section on line 4—4 of Fig. 2.
Figure 5:
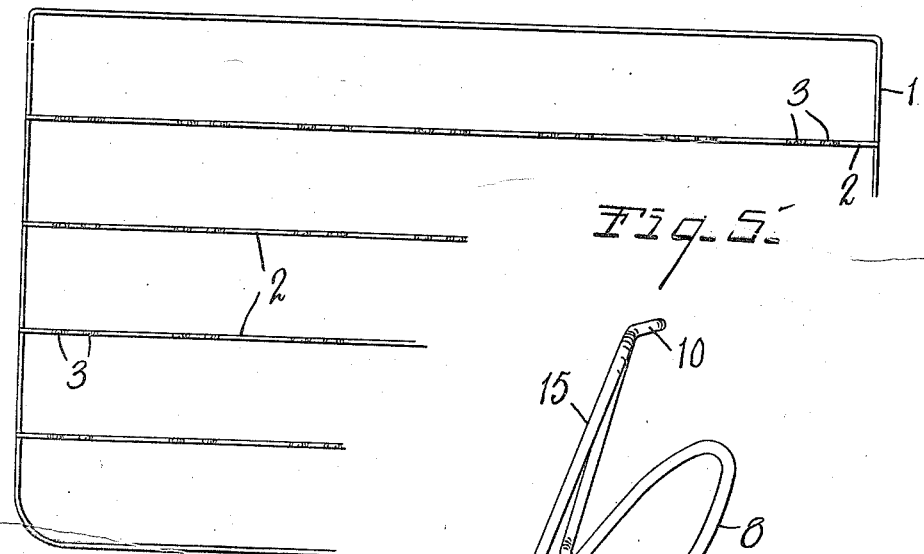
Fig. 5 is a fragmentary inverted view of the bottom frame.

Referring to the intermediate springs 8 of the rows, it will be noted that they are provided with loop-like hooked offsets 10 and 11 disposed in opposed relation, and that the end springs 5 of the row have only the hooked offset 10 while the end spring 6 of the row has only the hooked offset 11. The hooked loop-like offsets 10 are of such width that their arms engage in the offsets 3 of the cross members, while the hooked offsets 11 are of such width that they may be passed or hooked through the openings between the offsets 3, see Figs. 2, 3 and 4. This provides a very effective and secure interlock when the end coils of the springs are in substantially the same plane, adjacent pairs of springs being interlocked with each other and with the tie or cross members disposed between them.

Interlocking of the springs in the rows and securing the rows of springs in their proper spaced relation would result if the cross or tie members were not secured to the border frame 1, but one of the objects of my invention is to provide a structure which is very light and at the same time strong and rigid. The top coils of the springs are preferably connected by the coiled spring tie members 12. A top border frame 13 is provided to which the outer springs are secured by means of the clips 14.

Figure 6:
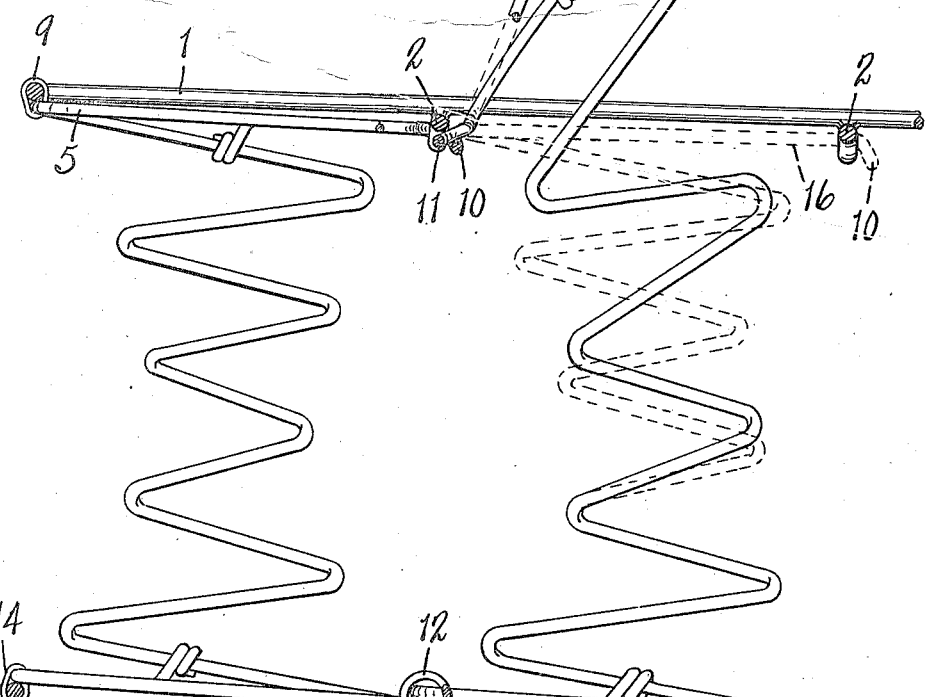
Fig. 6 is an enlarged inverted view illustrating certain of the steps in assembling the spring.

In Fig. 6 I illustrate the steps of a desirable method of assembling in which the springs are first secured to the top border frame 13 and connected by means of the helical tie members 12. Other connections might be employed, but it is of advantage to have the springs of the unit assembled in their proper relation and suitably supported in their proper relation as a preliminary step to assembling with the frame 1 and the tie or cross members 2. When the springs are assembled as indicated in Fig. 6, that is, previously connected at one end, the frame 1 and the cross members 2 fixed thereto are superimposed upon the assembled springs, and, beginning at one end of a row of springs, the loop-like offset 10 of the first spring of the row is dropped into the offsets 3. The end coil of the next spring is tilted as indicated at 15 in Fig. 6, and its hooked loop 11 inserted through the loop 10 between its bight and the reach 4 between the offsets 3. The end coil is then swung down to the position shown by dotted lines at 16, Fig. 6, which automatically brings the offset loop or hook 10 into engaging position with the next cross member. This manipulation may be quickly performed and the springs are effectively interlocked with each other with the cross members between them.

It will be observed that the spring 5 at one end of each row is provided only with the offset 10 while the spring 6 at the other end of the row is provided only with the offset 11. This is of advantage as there are no projections such as would result from the offsets if the springs were all duplicates, that is, each provided with opposed offsets 10 and 11, as are the intermediate springs 8.

After the springs are engaged with each other and with the cross members as described, the clips 9 may be applied.

The completed unit is very strong and rigid, even when the frame and cross members are of comparatively light material, owing to the fact that the parts are all securely tied together.

My improved spring assembly is economical in its parts and the springs may be very rapidly assembled. The frame 1 may be of any desired form, both in outline and in the matter of material, depending upon the purpose to which the spring assembly is to be put. While it is desirable to have the cross or tie members secured thereto, for certain purposes that is not necessary or desirable.

I have illustrated and described my invention in one very practical embodiment thereof. I have not attempted to illustrate or describe certain adaptations and adaptations which I contemplate as it is believed this disclosure will enable those skilled in the art to embody or adapt my invention as may be desired.

Having thus described my invention what I claim as new and desire to secure by Letters Patent is:

1. In a spring structure, the combination with a plurality of rows of coiled springs, of a bottom border frame, cross members disposed transversely of the rows of springs and secured to opposed portions of said border frame, said cross members being disposed between adjacent pairs of springs of the rows and having pairs of spaced offsets alined with the rows of springs, the end coils of the springs having opposed hooked loop-like offsets, one hooked loop-like offset of an adjacent pair of springs being disposed with its arms engaging the pair of offsets of the cross member between said pair of springs, the mating hooked loop-like offset of the other spring of the pair being passed between the bight of the offset engaging the offsets of the cross member and the cross member and locking the two together, the second member being retained in hooked engagement with the cross member when the end coils of the mating springs are swung to approximately the same plane.

2. In a spring structure, the combination with a plurality of rows of coiled springs, of cross members disposed transversely of the rows of springs and provided with pairs of spaced upwardly disposed offsets alined with the rows of springs, the end coils of springs of the rows on opposite sides of cross members having co-engaging laterally offset hooked interlocking loops, the loop of one of an adjacent pair of springs being disposed with its arms in engagement with the offsets of the cross member, the loop of the other spring of the pair being disposed between the bight of the loop of the first named of the pair of springs and the cross member and held in hooked engagement with the cross member between its offsets by the co-engaging loop when the springs are in assembled relation.

3. In a spring structure, the combination with a series of coiled body springs having end coils provided with loops offset from the plane of the coil, the offset loop of one of an adjacent pair of springs being of such width as to receive the offset loop of the other of the pair of springs, and a tie member having spaced offsets therein with which the wider offset loop is engaged with the bight portion thereof disposed in spaced relation to the reach of the tie member between its offsets, the loop of the other spring of the pair being passed between the bight of the wider loop and the tie member and in engagement with the reach of the tie member, the bight of at least one of said loops being disposed on the opposite side of the tie member from its corresponding coil member and restrainingly engaging the legs of the other loop whereby the springs are locked together when the end coils thereof are in approximately the same plane.

4. In a spring structure the combination of a series of coiled springs having corresponding end coils provided with loops offset from the plane of the coil, the offset loop of one of an adjacent pair of springs being of such width as to receive the mating offset loop of the other of the pair of springs, and a tie member having projections thereon constituting positioning members with which the wider offset is engaged for supporting it against movement longitudinally of the tie member and with the bight portion of the offset disposed in spaced relation to the tie member, the loop of the other spring of the pair being disposed between the bight of the wider loop of the other spring of the pair and in engagement with the tie member, the bights of said loops being disposed on opposite sides of the tie member from their respective coils and one of the loops restrainingly engaging the other loop whereby the springs are locked together and locked to the tie member when the end walls thereof are in approximately the same plane.

5. In a spring structure, the combination of a pair of coiled body spring members having end coils provided with loop elements including portions offset from the plane of the coil, one of said loops being of such width as to receive the other, and a tie member between said springs engaged by and positioning said loops with the bight of each of the loops on the opposite side of the tie member from its corresponding coil, the wider offset loop receiving the other loop between the bight thereof and the tie member, said bight restrainingly engaging said other loop whereby the springs are locked together when the end coils thereof are in approximately the same plane with said offset portions disposed in side engagement with the tie member.

EDWARD P. KRAJEWSKI.